United States Patent [19]

Everts et al.

[11] 4,107,070
[45] Aug. 15, 1978

[54] PROCESS FOR IMPROVING THE PROPERTIES OF OXYSULFIDE PHOSPHOR MATERIALS

[75] Inventors: Clifford Leon Everts, Hilton; David Michael Taylor; Paul John Delmore, both of Rochester, all of N.Y.

[73] Assignee: Eastman Kodak Company, Rochester, N.Y.

[21] Appl. No.: 746,034

[22] Filed: Nov. 29, 1976

[51] Int. Cl.$^2$ ............................................. C09K 11/46
[52] U.S. Cl. ............................................. 252/301.4 S
[58] Field of Search .................. 252/301.4 S; 250/483

[56] References Cited

U.S. PATENT DOCUMENTS

| | | | |
|---|---|---|---|
| 3,563,909 | 2/1971 | Schuil et al. | 252/301.4 S |
| 3,705,858 | 12/1972 | Luckey et al. | 252/301.4 S |
| 3,904,546 | 9/1975 | Mattis et al. | 252/301.4 S |

OTHER PUBLICATIONS

Martin et al., "Technical Notes," (RCA), 12/11/68.

Primary Examiner—Jack Cooper
Attorney, Agent, or Firm—Arthur L. Girard

[57] ABSTRACT

A process is described for improving the properties of a phosphor material comprising an oxysulfide that has been subjected to grinding, in which the phosphor material is heated while exposed to an oxygen-containing atmosphere at a temperature of about 600° to about 1000° C. The processed phosphor material can be used, for instance, in x-ray screens.

16 Claims, No Drawings

PROCESS FOR IMPROVING THE PROPERTIES OF OXYSULFIDE PHOSPHOR MATERIALS

BACKGROUND OF THE INVENTION

This invention relates to phosphor materials, such as those used in x-ray screens. In particular, it relates to a process for improving the properties of a rare-earth-activated yttrium, lanthanum, or gadolinium oxysulfide phosphor material that has been subjected to grinding, and to x-ray screens prepared using such a phosphor material.

It is well known that certain materials referred to as phosphors have the property of absorbing one type of electromagnetic radiation (exciting radiation) and emitting a second, usually lower energy, type of electromagnetic radiation. Thus calcium tungstate and other known phosphor materials have been used to convert x-ray image patterns into radiation which can be advantageously recorded on photographic film. The phosphor material is typicaly used in the form of a layer of phosphor particles, which comprise an x-ray screen. The phosphor particles forming the layer are typically imbedded in a binder matrix, and the layer may be coated on a support, such as a polymeric sheet.

In order to increase image resolution, decrease quantum mottle, and otherwise improve the final image when using an x-ray screen, it is desirable to use a phosphor material having uniform small particle size. In the preparation of phosphor materials it often happens that the phosphor as initially prepared comprises aggregations of individual phosphor particles. Various grinding methods known in the art can be used to break up such aggregations, and, if desired, to further reduce the size of individual phosphor particles; these include ball-milling, air impact pulverizing, etc.

However, certain phosphor materials are known to exhibit a decrease in luminescence after grinding. This is true for Lenard phosphors, such as zinc sulfide. U.S. Pat. No. 2,187,022, issued Jan. 16, 1940, describes a method of restoring the luminescence of such phosphor materials by heating the phosphor particles as they pass through a substantially inert gas, such as nitrogen.

U.S. Pat. Nos. 2,729,604 and 2,729,605, both issued Jan. 3, 1956, describe, respectively, bismuth- and antimony-activated ('604), and samarium-activated ('605), lanthanum oxychloride phosphors, and methods for their preparation. The described methods can involve multiple heating and pulverizing steps, including a calcining step at 800° to 1100° C.

U.S. Pat. No. 3,113,929, issued Dec. 10, 1963, describes a method for increasing the electroluminescence of electroluminescent phosphors, such as a phosphor comprising zinc sulfide (90%) — zinc oxide (5%) — magnesium oxide (5%), including heating such an electroluminescent phosphor to a temperature between about 700° and 1000° C in the presence of oxygen.

More recently, certain oxysulfide phosphor materials having useful cathodoluminescent and x-ray luminescent properties, and methods for their preparation, have been described in the art. For instance, U.S. Pat. Nos. 3,418,246 and 3,418,247, issued Dec. 24, 1968, and U.S. Pat. No. 3,705,858, issued Dec. 12, 1972, describe various rare-earth activated phosphor materials and methods for their preparation, including yttrium, lanthanum, and gadolinium oxysulfides. In the method of preparation described in U.S. Pat. No. 3,705,858, for instance, a precursor of the phosphor is precipitated from solution under carefully controlled conditions; the precipitate is then heated in a reducing atmosphere to form the phosphor, followed by annealing in an inert atmosphere, such as annealing in a covered crucible. While oxysulfide materials as described possess advantageous properties as phosphors, it is desirable to further improve their properties where possible.

For instance, in x-ray screens oxysulfide phosphor materials having a particle size in the range of about 1 micron to about 25 microns are useful. When oxysulfide phosphor materials are subjected to grinding to achieve the desired particle size, these phosphor materials exhibit a decrease in liminescence. Luminescence, as used herein, refers to electromagnetic radiation emissions from the phosphor material occurring concurrently with the period of exposure to exciting radiation. The adverse effects resulting from the grinding of oxysulfide phosphor materials are independent of the particular method of grinding used.

Also, it is indicated in the art that such oxysulfide phosphor materials are intolerant of heating in the presence of oxygen, such as in air. See, for instance, U.S. Pat. No. 3,864,273. In a study of the properties of selected europium-activated rare earth oxygen sulfur compounds reported in the J. Electrochem. Soc.: SOLID STATE SCIENCE, October, 1968, pp. 1060–1066, differential thermal analysis (DTA) data and thermogravimetric analysis (TGA) data indicated that oxidative decomposition of the yttrium, lanthanum, and gadolinium oxysulfides when heated in air begins to occur at temperatures between about 350° and 595° C, depending on the particular analysis used and the particular oxysulfide being tested. It was also reported in "Crystal Growth of Lanthanum Oxysulfide," by L. E. Sobon, presented at the A.C.C.G. Conference on Crystal Growth, Gaithersburg, Maryland, 1969, that lanthanum oxysulfide oxidizes when heated in air at 600° C. It would thus appear undesirable to heat oxysulfide phosphor materials while exposed to oxygen-containing atmospheres, e.g., air, at temperatures above 600° C.

Another property exhibited by oxysulfide phosphor materials is afterglow. Afterglow, as used herein, refers to the persistence of electromagnetic radiation emissions from the phosphor material after termination of the exciting radiation. In most situations, e.g., x-ray screens, it is desirable to minimize afterglow. Although the problem of afterglow can be aggravated by the presence of unwanted impurities, even relatively pure oxysulfide phosphors exhibit some afterglow.

SUMMARY OF THE INVENTION

In accordance with this invention, it has been found that the properties of rare-earth-activated yttrium, lanthanum, and gadolinium oxysulfide phosphor materials that have been subjected to grinding can be improved by heating the phosphor material while exposed to an oxygen-containing atmosphere at a temperature of about 600° to about 1000° C. The improved phosphor material can be used, for instance, in x-ray screens.

DESCRIPTION OF PREFERRED EMBODIMENTS

In the practice of the invention, the described process is applied to a rare-earth-activated yttrium, lanthanum, or gadolinium oxysulfide that has been subjected to grinding.

Preferred rare-earth activated yttrium, lanthanum, and gadolinium oxysulfide phosphor materials for the practice of the invention are those described in U.S. Pat. No. 3,418,246; 3,418,247; and 3,705,858; the disclosures of which are hereby incorporated by reference. The oxysulfide phosphor material can also contain more than one host metal, such as, for instance, a rare-earth-activated lanthanum oxysulfide wherein a portion of the lanthanum has been replaced with gadolinium.

Despite the indications in the prior art that oxysulfide phosphors should not be heated above 600° C in air, it has been found in this invention that improvement in the properties of oxysulfide phosphor materials is achieved by heating the phosphor material while exposed to an oxygen-containing atmosphere at a temperature of about 600° to about 1000° C. At heating temperatures below 600° no appreciable improvement in the properties of the phosphor material is observed. If the heating temperature is increased to above 1000° C, the properties of the phosphor material deteriorate. The reasons why oxysulfide phosphor materials heated in accordance with the invention exhibit improved properties is not fully understood, but it is believed that the heating process may eliminate impurities and damage to the crystal structure of phosphor particles which result from grinding.

Although the process of the invention can be practiced with various oxygen-containing atmospheres, air is a preferred, simple, convenient atmosphere in which to practice the process. It is also preferred to practice the process of the invention at atmospheric pressure, although both lower and higher pressures can also be used.

In one preferred embodiment of the invention, the ground phosphor material is heated in a mass while exposed to an oxygen-containing atmosphere, such as, for example, heating the material in air in an open crucible. By heating "in a mass" is meant that the individual phosphor particles are stationary with respect to one another and are in physical contact with one another, such as when the phosphor particles are heated in a stationary container. When heating the phosphor material in a mass for sample sizes such as those used in Examples 1–16, the material is typically heated for at least about 0.5 hour to about 2 hours. The most preferable heating time will vary with the particular phosphor material being processed, the heating temperature being used, and the size of the mass being heated, with longer heating times being more desirable for larger masses of material. A minimum heating time is desirable when heating the phosphor material in a mass in order to insure uniform heating throughout the mass. While there is no precise upper limit on the heating time, it is not generally desirable to heat the phosphor material for more than the time required to maximize the increase in luminescence.

In another preferred embodiment of the invention, the phosphor material is heated in the form of separated phosphor particles which are maintained in a separated condition during heating. Such an embodiment would include heating in a rotary kiln or a fluid bed oven. It is understood that in such an embodiment the "separated" phosphor particles may come in momentary contact with one another. As is the case when the phosphor material is heated in a mass, the most preferred heating time when the phosphor material is heated in the form of separated phosphor particles is subject to a number of variables. However, generally shorter heating times are necessary because the agitation of the phosphor material can promote quicker uniform heating; for instance, using a rotary kiln a typical heating time may be as short as 20 minutes.

In the case where the phosphor material has been ground to a very small average particle size range, such as 5 to 7 microns or less in diameter, it is preferred to heat the phosphor material in the form of separated phosphor particles, in order to minimize any tendency of the phosphor particles to reaggregate.

The process of heating the oxysulfide phosphor material while exposed to an oxygen-containing atmosphere at a temperature of from about 600° to 1000° C results in a dramatic improvement in the luminescence of the phosphor material compared to the luminescence of the phosphor material after grinding but before heating in air. These improvements can be measured by film density determinations or, conveniently, by powder speed determinations as hereinafter described. In many cases, the process of the invention will result in such an improvement in the luminescence of the phosphor material that the final luminescence is greater after grinding and processing according to the invention than was the luminescence of the initial unground phosphor material; this is particularly so where the grinding step has substantially broken up aggregations of phosphor particles without significantly reducing the average phosphor particle size.

In one embodiment of the invention the phosphor material which is subjected to grinding, followed by heating while exposed to an oxygen-containing atmosphere at a temperature of about 600° to about 1000° C, comprises terbium-activated lanthanum oxysulfide. In a preferred aspect of this embodiment, the phosphor material is heated in air at a temperature of about 650° to about 750° C.

In another embodiment of the invention, the phosphor material which is subjected to grinding, followed by heating while exposed to an oxygen-containing atmosphere at a temperature of 600° to 1000° C, comprises terbium-activated gadolinium oxysulfide. In the case of the gadolinium oxysulfide, preferably the phosphor material is heated in air at a temperature of about 700° to about 800° C.

Oxysulfide phosphor materials processed in accordance with the invention possess improved properties, and can be usefully incorporated, for example, in x-ray screens, as described in aforementioned U.S. Pat. No. 3,705,858.

In the following Examples 1–16 the luminescence of the phosphor samples were measured by the procedure hereinafter described. The numerical values used to express the speed of the phosphors are arbitrary units, depending on the particular equipment and how it is used, but they do show the relative improvement in luminescence.

In the examples, a portion of each phosphor sample was packed into a planchette which was held in a 2 × 2 × ½ inch plastic block. The powder speed determinations were made according to the following procedure:

The block was placed in a sample holder in a cabinet type x-ray generator apparatus (Field Emission Corp. Model 8050 Faxitron). A lead-shielded, DC-powered photomultiplier tube (RCA S-4 type) was positioned within the cabinet, and was connected to an electrometer (Keithly Instruments Model 610C) to measure and record the luminescence of the sample. The apparatus was activated and the sample was exposed to x-radiation filtered through a 0.33 mm thick copper foil and a 1.22 mm thick aluminum foil, with a potential of 100 kilovolts at 3 milliamperes. The speed of the phosphor material as measured by the photomultiplier tube was indicated by the electrometer.

The reading of the electrometer is proportional to the luminescence of the phosphor material. Day-to-day variations in the reading of the apparatus may be determined and corrected by testing a known sample just prior to testing an unknown sample.

EXAMPLE 1

A sample of about 150 grams of a terbium-activated (0.6% by weight) gadolinium oxysulfide material, ground to achieve a particle size range of 8 to 10 microns in diameter, was placed in an open quartz crucible. The crucible was placed in an air-containing oven which was preheated to a temperature of 700° C. After heating for 40 minutes, the phosphor material was removed from the oven. After the phosphor material was cool, its speed was tested according to the procedure set forth above. The gadolinium oxysulfide phosphor material, which had an initial speed before grinding of 1235, and a speed after grinding of less than 500, had a speed of about 1440 after the heating in air.

EXAMPLES 2–16

Table I indicates the powder speed of other samples which were subjected to grinding, followed by heating in a crucible, as in Example 1, for the times and temperatures indicated. The results of the table show that heating the phosphor material in accordance with the invention greatly improves the luminescence of the phosphor material when compared to the luminescence of the phosphor immediately after grinding.

Table I

| Example | Phosphor Material | Speed Before Grinding | Speed After Grinding | Heating in Air | | Speed After Grinding and Heating in Air |
|---|---|---|---|---|---|---|
| | | | | Time (min) | Temp. (° C) | |
| 1 | Tb-activated gadolinium oxysulfide | 1235 | <500 | 40 | 700 | 1440 |
| 2 | " | " | " | 60 | 700 | 1440 |
| 3 | " | " | " | 90 | 700 | 1430 |
| 4 | " | " | " | 40 | 800 | 1420 |
| 5 | " | " | " | 60 | 800 | 1415 |
| 6 | " | " | " | 90 | 800 | 1420 |
| 7 | " | " | " | 40 | 900 | 1060 |
| 8 | " | " | " | 60 | 900 | 975 |
| 9 | " | " | " | 90 | 900 | 775 |
| 10 | Tb-activated lanthanum oxysulfide | 1098 | <500 | 60 | 600 | 880 |
| 11 | " | " | " | 40 | 700 | 1160 |
| 12 | " | " | " | 60 | 700 | 1160 |
| 13 | " | " | " | 40 | 800 | 1110 |
| 14 | " | " | " | 60 | 800 | 915 |
| 15 | " | " | " | 40 | 850 | 580 |
| 16 | " | " | " | 60 | 1000 | 630 |

In addition to the expected improvements which result from using a ground phosphor material vis-a-vis the initial unground phosphor material, and the improvements in luminescence achieved in the practice of the invention as described above, it is also observed that ground phosphor material processed in accordance with the invention exhibits improved afterglow properties compared to the initial unground phosphor material. The following example demonstrates these improved afterglow properties.

EXAMPLE 17

A sample of an unground terbium-activated (0.6% by weight) gadolinium oxysulfide phosphor material (Sample A) and a sample of the same phosphor material which had been subjected to grinding followed by heating in a crucible in air at 800° C for 40 minutes (Sample B) were each tested as follows:

The phosphor material was thoroughly mixed with a polyurethane binder at a ratio by weight of 15:1 respectively. The mixture is coated on a poly(tetrafluoroethylene) support to form a layer, which, upon drying, is peeled from the support and exposed to x-radiation, using a Picker medical x-ray apparatus, filtered through a 2mm thick aluminum foil at a distance of about 1.22 meters for five seconds, with a potential of 70 kilovolts at 200 milliamperes. Thirty seconds after termination of exposure to x-radiation, the layer is placed in contact with a green-sensitive photographic film. Contact with the photographic film is maintained for ten minutes. The film is then developed. The density of the developed film corresponds to the afterglow properties of the phosphor material.

When tested as described, the film density of Sample A was 0.28, whereas the film density of Sample B was 0.17. Phosphor material that had been subjected to grinding only also exhibited a small amount of afterglow (density=0.08).

The invention has been described in detail with particular reference to certain preferred embodiments, but it will be understood that variations and modifications can be effected within the spirit and scope of the invention.

What is claimed is:

1. A process for improving the x-ray luminescent properties of a rare-earth activated yttrium, lanthanum, or gadolinium oxysulfide phosphor material that has been subjected to grinding, comprising heating the phosphor material while exposed to an oxygen-containing atmosphere at a temperature of about 600° to about 1000° C for a time sufficient to improve the x-ray luminescent properties of the ground phosphor material.

2. A process as in claim 1 wherein the phosphor material is heated while exposed to air.

3. A process as in claim 1 wherein the phosphor material is terbium-activated.

4. A process as in claim 1 wherein the phosphor material is heated in a mass for a period of between about 0.5 and about 2 hours.

5. A process as in claim 1 wherein the phosphor material is heated in the form of separated phosphor particles which are maintained in a separated condition during heating.

6. A process for improving the x-ray luminescent properties of a terbium-activated lanthanum oxysulfide phosphor material that has been subjected to grinding,
comprising heating the phosphor material while exposed to an oxygen-containing atmosphere at a temperature of about 600° to about 1000° C for a time sufficient to improve the x-ray luminescent properties of the ground phosphor material.

7. A process as in claim 6 wherein the phosphor material is heated while exposed to air.

8. A process as in claim 6 wherein the phosphor material is heated at a temperature of about 650° to about 750° C.

9. A process as in claim 6 wherein the phosphor material is heated in a mass for a period of between about 0.5 and about 2 hours.

10. A process as in claim 6 wherein the phosphor material is heated in the form of separated phosphor particles which are maintained in a separated condition during heating.

11. A process for improving the x-ray luminescent properties of a terbium-activated gadolinium oxysulfide phosphor material that has been subjected to grinding,
comprising heating the phosphor material while exposed to an oxsygen-containing atmosphere at a temperature of about 600° to about 1000° C for a time sufficient to improve the x-ray luminescent properties of the ground phosphor material.

12. A process as in claim 11 wherein the phosphor material is heated while exposed to air.

13. A process as in claim 11 wherein the phosphor material is heated at a temperature of about 700° to about 800° C.

14. A process as in claim 11 wherein the phosphor material is heated in a mass for a period of between about 0.5 and about 2 hours.

15. A process as in claim 11 wherein the phosphor material is heated in the form of separated phosphor particles which are maintained in a separated condition during heating.

16. A process for improving the x-ray luminescent properties of a terbium-activated yttrium, lanthanum, or gadolinium oxysulfide phosphor material that has been subjected to grinding,
comprising heating the phosphor material while exposed to air at a temperature of about 600° to about 1000° C in a rotary kiln for at least twenty minutes.

* * * * *